United States Patent Office 3,523,019
Patented Aug. 4, 1970

3,523,019
FERTILIZERS CONTAINING MICRO- AND MACRONUTRIENTS
Otis D. Philen, Jr., Raleigh, N.C., and Julius Silverberg, Florence, and Melvin M. Norton, Sheffield, Ala., assignors to Tennessee Valley Authority, a corporation of the United States
No Drawing. Application June 28, 1968, Ser. No. 741,208, which is a division of application Ser. No. 491,464, Sept. 29, 1965. Divided and this application Sept. 4, 1969, Ser. No. 855,358
Int. Cl. C05b 11/10
U.S. Cl. 71—36                                    3 Claims

ABSTRACT OF THE DISCLOSURE

Granules of hygroscopic fertilizer salts are coated with micronutrient powders which, when wetted with water and/or steam, react with the fertilizer constituents to form in situ stable compounds such as $$Zn_3(NH_4)_2(P_2O_7)_2 \cdot 2H_2O, \quad M(NH_4)_2(P_2O_7)_2 \cdot 2H_2O$$

or complex zinc ammonium hydroxy nitrates. The complex fertilizer compounds maintained good physical properties of the fertilizers and also act as available sources of micronutrient fertilizer elements.

---

The invention herein described may be manufactured and used by or for the Government for governmental purposes without the payment to us of any royalty therefor.

This application is a division of our copending application Ser. No. 741,208, filed June 28, 1968, which in turn is a division of our application Ser. No. 491,464, filed Sept. 29, 1965 (now U.S. Pat. 3,423,199), both for "Fertilizers Containing Micro- and Macronutrients."

Our invention relates to the incorporation of micro and secondary nutrients in solid fertilizers and, more particularly, to new processes and compositions of matter whereby the most efficient and economical sources of these nutrients at their most effective levels of application may be incorporated in the solid fertilizers via the most desirable method of adding the micro and secondary nutrients to macronutrient fertilizer particles.

There is an increasing need for supplying micro and secondary nutrients in solid fertilizers. This need for micro and secondary nutrient materials (hereinafter referred to for the sake of simplicity as micronutrient materials) in crop production is growing rapidly because natural sources of these materials are being exhausted and because incidental sources of micronutrient materials formerly associated with standard fertilizers no longer are available, this latter limitation being due in part to the fact that modern fertilizers are relatively pure and do not contain adequate amounts of incidental micronutrient sources. In addition, this need for supplying micronutrient materials in solid fertilizers is further accentuated by the increased crop yields realized by the use of high-analysis fertilizers containing relatively little micronutrients in that the increased crop yield per acre deletes, to a greater extent, the natural micronutrient sources from the soil. A still additional need for incorporating micronutrients in solid fertilizers arises out of the consideration of convenience to the farmer such that separate applications of micronutrient and macronutrient materials may be avoided by combining both of these types of materials in a solid fertilizer form thereby to avoid the expense of double application, and further, that the micronutrient should be incorporated in a granular fertilizer due to the fact that this is at the present time the most preferred form for efficient and trouble-free fertilizer application.

It has been well known and widely recognized in the chemical fertilizer art that soils deficient in certain essential minerals, i.e., micronutrients, do not produce vigorous, healthy plant growth. Further, it has been known that such manifestations of micronutrient deficiencies are directly related to the adverse effect of many diseases attacking the plant.

Heretofore, it has been the practice in the chemical fertilizer industry to correct and control the availability of the micronutrient materials by such means as rendering the natural supply of said materials in the soil more available to the plant by adjusting the pH of the soil, etc., and perhaps more importantly, by adding additional quantities of such materials to the soil, either during the time of application of fertilizer materials and lime thereto, or in separate application procedures. Since it is obviously more economical and convenient for the farmer to add both the micronutrient and macronutrient materials to the soil in a single application, it has been the practice in the art to find ways and means of combining the micronutrient materials with the macronutrient fertilizers such that in a single application of fertilizer materials to the soil there can be realized a somewhat uniform distribution of the micronutrient values together with the primary plant nutrient materials. Generally, three methods have evolved in the art in which to add micronutrients to granular macronutrient fertilizers, namely, dry blending, incorporation during granulation, and coating onto the surface of the finished fertilizer granule. It has been found that dry blending of granular micronutrient materials with granular macronutrient fertilizers is generally to be avoided, due to the low ratio of micronutrient particles to macronutrient fertilizer particles in the blend which results in a limited and spotty coverage during application in the field. Incorporation of the micronutrient material in granular fertilizer material appears to be the ideal method of adding such materials so far as uniformity and distribution are concerned. It has been found both in the art and in our earlier work, however, that addition of some of these micronutrient materials for incorporation in the granular fertilizers often times adversely affects granulation and, in some instances, the recycle rate had to be increased by as much as 400 to 500 percent of that normally found sufficient to otherwise granulate the material used as a carrier for the micronutrient sources. In addition, some of the sources of these micronutrient materials, such as the chelates, have been found to decompose with pH changes and at elevated temperatures and therefore, in addition to the extremely high recycle rate, the granulation procedure itself in these cases has to be very closely controlled. Also, from a purely practical standpoint, it has proved to be very costly to produce very many fertilizers having incorporated micronutrients therein in any one granulation plant due to the large manpower and equipment cleaning requirements. Also, maintaining a number of fertilizers with various micronutrients as separate inventories in storage is impractical. On the other hand, we have found that the coating process for adding micronutrient materials to granular fertilizers is most readily adaptable to the production of prescription-type fertilizers at low cost because of the rather inexpensive initial equipment cost, the low manpower requirements, and the versatility of such a procedure. This procedure is readily adaptable to application on a prescription basis immediately prior to shipment.

Our invention, therefore, is directed to the coating of micronutrient values onto solid fertilizer materials, particularly granular fertilizers, by a new and unique method and approach for the coating of said granular fertilizer particles with the desired micronutrient sources.

We have overcome the disadvantages inherent in the prior-art methods of applying micronutrient sources uniformly to the soil to a substantial extent in one embodiment of the present invention by attaching micronutrient compounds to the surface of macronutrient-containing fertilizer granules by means of a binder that interacts either with the micronutrient or macronutrient compound, thereby binding the micronutrient compounds more firmly to the granular surface. In certain embodiments of our invention, the interaction between the micronutrient and macronutrient compounds may be either of a chemical or physical nature, or both. The micronutrient values studied in our work and used therein were boron, cobalt, copper, iron, manganese, magnesium, molybdenum, sulfur, and zinc. In addition, in evaluating sources of these various nutrients, oxides, sulfates, sulfides, carbonates, silicates, and chelates were used, as well as the base granular fertilizers. Furthermore, several new and advantageous features over conventional prior-art methods of incorporating micronutrient values in solid fertilizer materials are realized by the present invention.

Among these advantages are: the convenience and ease in preparing a large variety of prescription-type fertilizers of varying proportions and ratios of micronutrient and macronutrient materials in that in our process the macronutrient-containing granular fertilizer may be produced and stored until ready for shipment. Micronutrient compounds can then be applied quickly and easily in varying proportions, thereby making it feasible to make products of varying micronutrient:macronutrient ratios without the necessity of supplying a great number of storage bins. In addition, the adherence of the micronutrient values to the macronutrient fertilizer granules prepared according to our process is unusually high, thereby effectively minimizing recycle requirements, the use of large excesses of micronutrient material applied and, in general, the cost of application to the granular fertilizer. Also, the unusually high adherence of the micronutrient materials to the fertilizer granules realized in practicing our process effectively insures maximum homogeneity of these values when subsequently applied to the soil.

In still other embodiment of our invention, we have found that, under certain conditions and particular applications, we may apply or coat micronutrient materials onto fertilizer granules in a manner somewhat departing from our primary concept of using a binder that interacts either with the micronutrient or the macronutrient compound. In one of these embodiments, we find that we may use a binder such as petroleum oil or, in a more practical application, used motor oil as a binder for attaching the micronutrient powders to the surface granules. In this embodiment, the main problems in using such binding material are (1) getting the binder uniformly applied to the granule surface throughout the batch of fertilizer, (2) proper bonding of the binder to the surface and of the micronutrient material to the granular surface or binder, and (3) maintaining good physical condition of the final product. Critical factors in the use of such a binder have been found to be the viscosity of the binder at the time of application, the thickness of the binder layer, and the method of application. In still a further embodiment of our invention which departs from the primary concept of utilizing a binder that interacts either with the micronutrient or the macronutrient compound, we have found, and will describe in greater detail infra, a process wherein the micronutrient material is ground to an extremely fine particle size as a means of attaining desirable attachment thereto. In this embodiment, we have found that our objectives can be accomplished by forming granules of the macronutrient material and drying the so formed granules to a relatively low level of moisture content, and placing the micronutrient material on the surface of the granules in such a way as to provide adherence to the granular surface without extensive reaction therewith. In the preferred method for carrying out this third embodiment of our process, fertilizers such as ammonium phosphate, superphosphate, urea, ammonium nitrate and mixed fertilizers are granulated and dried to the desirable moisture content where good storage is ensured. The granules are then mixed vigorously for at least three minutes with a micronutrient compound ground to a fine particle size, i.e., preferably 95 percent or more through a standard 325-mesh screen. In some instances, we have also found it desirable in this embodiment of our invention to use a conditioning agent such as clay to prevent caking during subsequent storage in addition to the extremely fine-ground micronutrient material. We have also found that in this embodiment, the mixing time of granules with the extremely finely ground micronutrient material is critical; a mixing time of at least three minutes should be used. By this means, the micronutrient particles have been found to be driven into the interstices of the granular surface and thereby held firmly. Although these two embodiments of our invention which depart somewhat from the primary concept of our invention relating to the use of a binder that interacts with either the micronutrient or macronutrient compounds are generally effective, there are many instances wherein drawbacks in such approaches have been encountered. For instance, an oil binder obviously cannot be used on ammonium nitrate granules because of the resulting fire and detonation hazard. In addition, the extremely fine grinding of the micronutrient material for use in the embodiment when the fine particles are driven into the interstices of the granule surface and therein held firmly may not in many instances be feasible due to the lack of equipment or, more importantly, the type of micronutrient material available. In such cases, the primary concept of our invention is quite useful since it is simple and can be used with any of the micronutrient source materials. In addition to the above embodiments, we have discovered a ramification of the principal embodiment therein when the fertilizer granule to be coated is ammonium nitrate. In this variation of the principal embodiment for practicing our process in forming several of the new compositions of matter which result therefrom, we have a method wherein we dissolve a micronutrient compound to be utilized in nitric acid to form the nitrate thereof and then to ammoniate the so-formed nitrate to the desired degree. The resulting nitrate solution can then be sprayed on a surface of the ammonium nitrate granules and there further ammoniated, or it can be ammoniated in a tank.

It is therefore an object of the present invention to provide new and improved processes and compositions resulting therefrom for incorporating micronutrient values onto granular fertilizer materials by coating said micronutrient values onto the surface of the granules or into the interstices of the granule surface.

Another object of the present invention in a principal embodiment thereof is to provide a process to bind micronutrient compounds to the surface of granules containing macronutrient compounds in such a way as to incorporate the micronutrient intimately into the structure of the granule surface rather than in a shell surrounding the granule.

Still another object of the present invention in a principal embodiment thereof is to provide a process to bind micronutrient compounds to the surface of granules containing macronutrient compounds in such a way as to incorporate the micronutrient intimately into the structure of the granule surface rather than in a shell surrounding the granule, which process is characterized by the fact that the micronutrient is so firmly bound to the granular surface as to prevent any appreciable sloughing off of same during the subsequent handling of the so-formed fertilizer assemblage.

Still further and more general objects and advantages of the present invention will appear from the more detailed description set forth below, it being understood, however, that this more detailed description is given by way of illustration and explanation only and not by way of limitation, since various changes therein may be made by those skilled in the art without departing from the spirit and scope of the present invention.

In carrying out the objects of our invention in certain forms and principal embodiments thereof, we have found that these objects can be achieved by using a solution of macronutrient compound as the binding agent. This solution accomplishes its binding function by depositing a layer of crystals on the granule surface. The deposited crystals hold the micronutrient compound firmly, either by reaction with the macronutrient particles or by holding them mechanically in the tightly bound crystal network embedded in pores of the granular surface.

We believe that the principal concept underlying our invention resides in the formation of a network of fine crystals on and in the irregular surface of the fertilizer granules. This network holds the micronutrient particles which may be either soluble or insoluble compounds, either mechanically or by reaction with the micronutrient, so that the formed crystals themselves contain micronutrient. An important phase of this concept is the formation of crystals that take up water during their formation, either as hydrate water or water of constitution, thereby converting liquid water from the applied solution to a solid form and reducing the tendency of the liquid water to cause poor physical condition of the product. As an alternate method to the supplying of a solution of the macronutrient material, the solution may be formed in situ by applying water or steam to the granular surface, thereby dissolving salt and forming the desired solution. For example, ammonium nitrate granules can be coated with a zinc compound by spraying with a small amount of water or treating with steam. The resulting film of ammonium nitrate solution on the surface of the granule has been found to react with the zinc compound to give a product composition having the formulas $M_5NH_4(OH)_9(NO_3)_2 \cdot 3H_2O$ and $3M(OH)_2 \cdot NH_4NO_3$, where M is a divalent element such as zinc. In the instance where zinc is the micronutrient value to be added, these compounds are easily formed by adding the zinc compound to an ammonium nitrate solution in the proper proportions. As will be shown in examples infra, these compounds may be formed either by dissolving the zinc compound in ammonium nitrate solution or they may be formed on the ammonium nitrate granule in situ by applying water or steam to the surface of the granule and adding the zinc thereto. The precipitation of these compounds occurs readily and completely. The products therefrom are water insoluble and therefore useful as slow release sources of nitrogen. Various materials containing zinc, both soluble and insoluble, have been found suitable for preparation of the compounds including zinc oxide, zinc sulphate, zinc carbonate, and metallic zinc.

Although zinc is the preferred micronutrient which has been used in many of our studies, part or all of the zinc may be replaced isomorphously by manganese, copper, cobalt, magnesium, and other divalent metals.

If it is desired to produce one of these two new compounds in particular, we found that this can be accomplished by adjusting the pH of the reacting solution to the proper level. For example, the pH can be reduced to below 5 by addition of a small amount of nitric acid to the zinc compound-ammonium nitrate mixture, thereby precipitating $Zn_5NH_4(OH)_9(NO_3)_2 \cdot 3H_2O$. When such a method is used in applying a coating to ammonium nitrate granules, subsequent ammoniation prevents poor physical condition associated with the acidity. Conversely, adjustment of the mixture to a pH of about 6.5 yields the precipitation of the compound $3Zn(OH)_2 \cdot NH_4NO_3$ as the product on the granule surface.

As has been mentioned supra, a further ramification of our method for preparing these new compounds is to dissolve a micronutrient compound in nitric acid to form the nitrate and then ammoniate to the desired degree. We have found that the resulting nitrate solution can be sprayed on the surface of ammonium nitrate granules and there ammoniated, or it can be ammoniated in a tank. This latter method can be used as a simple way to incorporate micronutrient in manufacture of ammonium nitrate, i.e., the micronutrient compound is dissolved in the nitric acid stream entering the ammonium nitrate process, in a situation where it is desired to add the micronutrient material by incorporation rather than by the coating method with which we are principally concerned.

In order that those skilled in the art may better understand how this principal embodiment of our invention for attaching micronutrient compounds to the surface of macronutrient-containing fertilizer granules by a binder that interacts either with the micronutrient or the macronutrient compound, the following examples of processes which we have used in the steps of producing micronutrient-coated granular solid fertilizers are given by way of illustration and not by way of limitation.

AMMONIUM NITRATE BINDER

Example I

Zinc metal was dissolved in nitric acid, the solution was cooled and diluted, and gaseous ammonia was added slowly. At about pH 5 a homogeneous crystal phase precipitated rapidly. This phase was removed and ammoniation continued. A second crystal phase began to precipitate at pH 6.5. This second salt was anhydrous, similar in morphological form to the first one, but with different refractive indices, X-ray diffraction spectrum, and chemical composition. Composition and empirical formulas for the two salts are as follows:

| pH of precipitation | Composition, percent | | | | Formula |
| --- | --- | --- | --- | --- | --- |
| | ZnO | $(NH_4)_2O$ | $N_2O_5$ | $H_2O$ (diff.) | |
| About 5 | 60.0 | 3.9 | 15.8 | 20.3 | $Zn_5NH_4(OH)_9(NO_3)_2 \cdot 3H_2O$ |
| About 6.5 | 65.6 | 6.9 | 12.3 | 15.2 | $3Zn(OH)_2 \cdot NH_4NO_3$ |

Example II

Zinc metal was added to a saturated solution of ammonium nitrate at room temperature. The trihydrate $$[Zn_5NH_4(OH)_9(NO_3)_2 \cdot 3H_2O]$$

precipitated rapidly, as indicated by optical properties of the compound.

Example III

Granular ammonium nitrate was mixed with 10 percent of zinc oxide and 2.5 percent of diatomaceous earth in a rotary mixer for 1 minute. A 70 percent ammonium nitrate solution was sprayed into the mixer throughout this period. Microscopic examination showed that the zinc oxide had reacted extensively to form a coating of $Zn_5NH_4(NO_3)_2(OH)_9 \cdot 3H_2O$. This reaction product, crystallized on the granule surface, held the unreacted portion of the zinc oxide in a tightly bonded coating.

Example IV

A blended fertilizer (16–16–16) made up from ammonium phosphate nitrate, diammonium phosphate, and potassium chloride—all granular—was mixed with manganese oxide (4%) and with zinc oxide (2.3%) for 1 minute in a rotary drum. Water (1.5%) was then sprayed in and mixing continued for another minute. Adherence of the micronutrient compounds was 98 percent. In contrast, without water the adherence was only 63 percent.

Example V

A similar fertilizer was mixed with twice as much of the micronutrient oxides as in Example IV above, followed by spraying with 1.5 percent water. Although immediate adherence was good (99%), after a week of storage adherence had dropped to 68 percent. In another test, conditions were the same except that 2 percent of calcined fuller's earth was mixed in after the water treatment. Adherence after 1 week was 91 percent.

Example VI

Ammonium nitrate was mixed with 10 percent of zinc oxide and 2.5 percent diatomaceous earth in a rotary drum for 1 minute; steam was introduced into the drum throughout the mixing period. Immediate adherence of the micronutrient was 98 percent. Without the steam, adherence was 90 percent.

Example VII

The tests in Example VI were repeated with 70 percent ammonium nitrate solution (1–3%) sprayed into the mixer rather than steam. Adherence in these tests was good without binder but use of the binder solution reduced dustiness in the mixer and made the products more resistant to sloughing off during handling. Microscopic examination showed that as much as half of the zinc oxide had reacted to form $Zn_5NH_4(NO_3)_2(OH)_9 \cdot 3H_2O$. The reaction product, crystallized on the granule surface, held the unreacted oxide in a tightly bonded coating. From 50 to 90 percent of the water from the ammonium nitrate solution was taken up in the hydrated reaction product formed.

Example VIII

In one series of tests, the zinc oxide-coated ammonium nitrate produced in the plant was dusty, and the zinc oxide was only loosely attached to the granules. Subsequently, pilot plants tests were made to determine methods of obtaining a more durable zinc oxide coating. In these tests, steam, ammonia, and ammonium nitrate solution were used as binders to increase adherence of the zinc oxide to the granular product. Both batch- and continuous-coating tests were made.

The batch-coating tests were made in a portable concrete mixer utilitizing batches of 150 pounds. In one series, about 10 percent of zinc oxide was added to unconditioned ammonium nitrate and 70 percent ammonium nitrate solution was added as a binder at rates ranging from 1.5 to 5.0 percent. Since only a small amount of unconditioned nitrate was available, it was necessary to use conditioned ammonium nitrate in other batch-coating tests. In these tests from 0.5 to 1.0 percent of ammonia, 0.3 to 2.4 percent of steam, or 1.5 to 3.0 percent of 70 percent ammonium nitrate was used as a binder for the 10 percent of zinc oxide that was added.

The continuous-coating tests were carried out at a rate of about 1 ton per hour in the pilot-plant ammoniator-granulator in which temporary lifting flights had been installed. In these tests about 10 percent by weight of zinc oxide was added to conditioned ammonium nitrate and 1.0 percent of steam or about 3.0 percent of 60 percent ammonium nitrate solution was used as a binder.

Adherence of the zinc oxide appeared to be less satisfactory in the continuous tests than in the batch tests. Modifications were made to the lifting flights in the continuous mixer in attempts to improve the mixing action but only slight improvements in the adherence of zinc oxide were obtained. Also, complete coverage of the binding agent on the fertilizer could not be obtained in the continuous mixer. Complete coverage was readily obtained in the batch tests.

In the batch tests produced by the use of either steam or 70 percent ammonium nitrate as a binder, the coated products were essentially dust free. The coatings produced with these binders were quite hard and most of the zinc oxide remained on the freshly coated granules after 1 minute of shaking on a Ro-Tap machine with a 16-mesh screen. The use of ammonia did not increase the adherence of zinc oxide to the nitrate granules.

Microscopic examinations of the coated products showed that the zinc oxide coating was loosely attached to the granular product when ammonia or no binder was added during the coating operation. When steam was used as a binder, a thin shell was formed around the coated granules. This shell was easily fractured leaving the zinc oxide free to flake off after the shell was broken. When ammonium nitrate solution was used as a binder, the zinc oxide was tightly bonded to the granules and resisted mechanical abrasion to a greater degree than the other coated products. The tight bond obtained with nitrate solution was the result of the formation of $$Zn_5NH_4(OH)_9(NO_3)_2 \cdot 3H_2O$$

by the reaction between the zinc oxide and ammonium nitrate solution.

Example IX

Plant-scale tests were made with unconditioned ammonium nitrate from production and with conditioned ammonium nitrate from storage. Test PC–1 was made with unconditioned ammonium nitrate fed at a rate to give about 10 tons per hour of coated product. Unconditioned ammonium nitrate, zinc oxide, and diatomaceous earth were fed continuously into the plant coating drum. Zinc was added at a level of 7.7 percent, and diatomaceous earth conditioner was added at a level of 2.2 percent of the coated product. The product contained 88 percent of the zinc added. After the Ro-Tap screening test, it contained only 45 percent of the zinc added. Conditioned ammonium nitrate from storage was used in test PC–2A. The procedure used was the same as that used for the unconditioned material except that no diatomaceous earth was added to the mixing drum and the feed rates were those required to produce about 8 tons per hour of coated material. Zinc was added at a level of 7.7 percent. The product from test PC–2A contained 93 percent of the zinc added; after the Ro-Tap screening test, the product contained 89 percent of the zinc added.

Test PC–2B was the same as test PC–2A except that 0.8 percent of steam was introduced into the coating drum. Operation was about the same as was obtained without the use of steam except that the product was less dusty when steam was used. The product from test PC–2B contained 88 percent of the zinc added. After the Ro-Tap screening test, it contained 82 percent of the zinc added.

The zinc oxide adhered to granular ammonium nitrate better in the batch test than in the continuous tests. Use of steam or ammonium nitrate solution as binders did not consistently increase the adherence of the finely pulverized zinc oxide to the nitrate granules, but dustiness of the product was substantially reduced by the use of these binders. The zinc oxide adhered to the conditioned product from storage better than to fresh unconditioned product.

The zinc oxide-coated products containing as much as 2 percent of diatomaceous earth and in which no more than 1 percent of steam or 3 percent of ammonium nitrate solution was used as binders were in good condition after 1 month of storage in bags.

AMMONIUM POLYPHOSPHATE BINDER

In addition to using an ammonium nitrate solution as binder for coating micronutrient materials on ammonium nitrate granules, we have found also that especially good results are obtained by use of an ammonium polyphosphate solution as a binder in place of an ammonium nitrate solution. The solution most convenient for this is 11–37–0 (11% N, 37% $P_2O_5$), made by neutralizing phosphoric acid of high $P_2O_5$ content (76% $P_2O_5$ or higher) with ammonia, as is shown in U.S. Pat. 2,950,961, Striplin, Jr. et al., patented Aug. 30, 1960, assigned to the assignee of the present invention. As is shown in Striplin et al., such a solution is a mixture of ammonium orthophosphate and ammonium pyrophosphate with lesser amounts of longer acyclic-chain polyphosphates. The proportions of the various constituents, i.e., the ammonium phosphates, vary with the concentration of the acid from which the solution is made; the higher the concentration the more polyphosphoric acid in the solution. When a micronutrient compound such as zinc oxide or zinc sulphate is added to such a solution, various micronutrient phosphates have been found to be formed. Under the conditions conductive to precipitation, we have found that the principal compound crystallizing is $$Zn_3(NH_4)_2(P_2O_7)_2 \cdot 2H_2O$$

We have found that this compound is quite insoluble and especially improves the physical condition of the product granules.

Both the zinc polyphosphates and the zinc ammonium nitrates have the advantage that they take up water as water of hydration or constitution, thereby tying up water added in the binder solution. This is an important consideration because any water added to a granule of soluble macronutrient compound affects physical condition adversely. Without the hydrating effect, use of fertilizer solutions as binders would be much less promising. If drying were required to remove the water, the process would prove to be uneconomical. An added advantage for the ammonium polyphosphate as a binder solution is that further reaction occurs on standing, i.e., hydrolysis occurs in the solution film on the granule surface with the result that additional water is taken up as water of constitution. Other macronutrient compounds such as ammonium orthophosphates, ammonium sulphate, potassium chloride, and urea can be used as a base for the binder solution. In using such materials, however, we have found that it is desirable to pick those that form a reaction product with the micronutrient compound that takes up water during crystallization. In using water to form the binder solution in situ, i.e., on the granular surface by applying water and steam thereto, we have found that it is helpful to apply an inert material in some instances such as clay to the granule surface after treatment with the binder solution and the micronutrient compound. Adherence of the micronutrient is thereby improved. Presumably, the finely ground inert material strengthens the crystal network deposit on the granule surface and thereby reduces breakage and sloughing off.

The following examples are an addition to those offered supra and are principally concerned with tests made using ammonium polyphosphate solutions as the binder for the micronutrient on the granule surface.

Example X

Granular triple superphosphate was mixed for 1 minute in a rotary mixer with 13 percent of a mixture of zinc, manganese, and iron oxides. As mixing continued, 2.8 percent of ammonium polyphosphate solution (11–37–0) was sprayed into the mixer. Adherence was close to 100 percent whereas without the use of the 11–37–0 solution the results were very poor. The product had good physical condition; the coating was extremely hard and smooth. As a result of hydrate formation, moisture content increased only from 1.48 to 1.94 percent.

Example XI

In tests similar to those in Example X above, a blend of ammonium polyphosphate and ammonium nitrate (27–9–0) was coated with 11 to 12 percent of micronutrient oxides by use of 3 percent of 11–37–0. Adherence was 99 percent as compared with 15 percent without the 11–37–0 solution.

Example XII

In tests similar to Example X above, a blend of ammonium polyphosphate and ammonium nitrate (27–9–0) was coated with 10 percent of micronutrient oxides by use of 3 percent of a 10–34–0 solution. Adherence was 98 percent as compared with about 15 percent without the use of the 10–34–0 solution as binder.

Example XIII

The efficiency and suitability of several liquid binder materials have been investigated in planning for the preparation of these micronutrient-coated fertilizers. Oil, as used in the past for a binder, is not considered to be entirely suitable because of its "weeping" through paper bags. Also, there have been indications that adherence of the micronutrients coated by the use of oil decreases on aging. This may result from the oil's being absorbed either by the paper bag or by the fertilizer. Oil also is not considered appropriate for use on ammonium nitrate products.

Bench-scale tests indicated that 11–37–0 liquid fertilizer base solution is a very good bonding agent for micronutrients in the oxide form. By use of 0.5 to 6 percent of this liquid, micronutrients were successfully coated on ammonium polyphosphate, ammonium orthophosphates, conventional granular fertilizers, and granular superphosphate. When 4 percent of 11–37–0 was used as a binder, as much as 22 percent manganese oxide was coated on ammonium polyphosphate with very good adherence.

FINELY GROUND MICRONUTRIENT—NO BINDER USED

As has been referred to supra, we have found in a related study for coating fertilizer granules with micronutrient materials that if the micronutrient compound is ground to an extremely fine particle size and applied to the surface of the granules by tumbling together for a definite period of time, good adherence may be obtained with certain combinations of fertilizer granules and micronutrient sources, which micronutrient sources lend themselves to such fine grinding. It has been found further that better adherence is obtained if a certain sequence of operations is followed; the micronutrient should be attached to the granules first, followed by attachment of a conditioning agent.

We have found also that, for combination of an insoluble micronutrient source with macronutrient material, a certain ratio of micronutrient to macronutrient should not be exceeded; otherwise, part of the micronutrient will not be effective agronomically. It is unexpected that an insoluble micronutrient compound would be effective at all, since it does not react with the macronutrient source to form a soluble product. Moreover, insoluble micronutrient compounds in granular form are not usually effective in the soil. However, the combinations prepared by the method described herein are often quite effective, presumably because the macronutrient material dissolves in the soil and the resulting solution dissolves the insoluble micronutrient compound. It might be expected that the reaction between micronutrient and macronutrient material, which otherwise would form an insoluble, immobile compound, would take place when the macronutrient solution dissolved the micronutrient compound in the soil. However, the micronutrient moves out into the soil from assemblages prepared according to the method of this invention. Presumably the dissolution takes place rapidly, and there is not time for precipitation of an immobile reaction product.

In the preferred method for carrying out the process, fertilizers such as ammonium phosphate, superphosphate, urea, ammonium nitrate, and mixed fertilizers are granulated and dried to the desired moisture content; the granules are then mixed vigorously for at least 3 minutes with a micronutrient compound ground to fine particle size, preferably 95 percent or more through 325 mesh, and a conditioning agent such as clay is then applied. When an insoluble micronutrient source is used, the amount is limited to that which will dissolve, to a major extent, in the soil solution resulting from dissolution of the macronutrient material. It has been found also that mixing time of granules with micronutrient material is critical; a mixing period of at least 3 minutes should be used. By this means the micronutrient particles are driven into interstices of the granule surface and held firmly.

In order that those skilled in the art may better understand how this particular embodiment of our invention relating to coating granules with micronutrient materials which have been ground to extremely fine mesh size and applied without the use of binder are given by way of illustration.

FINE GRINDING—NO BINDER

Example XIV

Ammonium polyphosphate was granulated and tumbled with zinc oxide ground to 97 percent through 325 mesh. Adherence was very good; as much as 12 percent zinc oxide could be applied with 96 percent adherence. In contrast, zinc oxide ground to only 66 percent through 325 mesh did not adhere well; in an attempt to add 6.8 percent zinc oxide, only 53 percent adhered. The ammonium polyphosphate in these tests was quite dry (moisture, about 0.2%).

Example XV

Ammonium nitrate was granulated and dried to a low moisture content (0.14% $H_2O$). The granules then were coated by tumbling with zinc oxide ground to 99.9 percent through 325 mesh, followed by mixing with 2.5 percent of diatomaceous earth conditioner. The amount of zinc oxide added was 10 percent of the total weight and mixing time was 3 minutes. Adherence was 97 percent. In contrast, when the sequence of adding conditioner first and zinc oxide second was used, adherence was only 86 percent. This was checked with another type of zinc oxide ground to 97 percent through 325 mesh. Respective adherences were 96 and 90 percent. Effect of mixing time was tested also. A mixing time of 1 minute gave only 67 percent adherence as compared with 97 percent for 3 minutes.

Example XVI

Zinc oxide was combined with pellets of ammonium polyphosphate in various ways and the test products subjected to a soil movement text. The pellets were embedded in moist soil (Hartsells fine sandy loam) for varying lengths of time, after which the pellets were removed and the amount of residual zinc oxide determined. The amount of zinc oxide that had moved out into the soil is shown in Table I below.

TABLE I

| Method of incorporation of zinc oxide | Percentage moved out into soil | |
| --- | --- | --- |
| | 1 day | 6 days |
| Dissolved in acid from which ammonium polyphosphate was made | 55 | 95 |
| Incorporated in ammonium polyphosphate melt during manufacture | 52 | 78 |
| Coated on pellet surface | 82 | 88 |

Thus, the insoluble oxide coated on the surface performed about as well as that incorporated during manufacture, indicating that the solution formed by dissolution of the ammonium polyphosphate dissolved the micronutrient oxide and carried it out into the soil. This was checked by testing a pellet made of a mixture of zinc oxide and soil; very little of the zinc oxide moved out from the pellet site.

Example XVII

Zinc sulphate, a soluble compound, was incorporated in ammonium orthophosphate granules in a ratio of 1 part Zn to 15 parts $P_2O_5$. Resulting solubility of the zinc in the product was less than 0.5 percent. This indicates the degree to which reaction of micronutrient and macronutrient compounds can immobilize the micronutrient; formation of a metal ammonium phosphate such as $Zn_2NH_4(PO_4) \cdot 2H_2O$ or $ZnNH_4PO_4$ is the cause. In a soil movement test of zinc incorporated in ammonium orthophosphates, most of the zinc was converted to an insoluble form and remained at the granule site. Coating of a soluble zinc compound on the surface of orthophosphate granules gives the best opportunity for avoiding this reaction and realizing maximum agronomic value from the micronutrient.

Example XVIII

Ammonium nitrate (0.1% $H_2O$) was coated with 2.1 percent of zinc oxide by the method of this invention. Petrographic examination showed that there was no reaction between the two compounds. In contrast, when an appreciable amount of moisture is present, insoluble compounds such as $Zn_5NH_4(NO_3)_2(OH)_9 \cdot 3H_2O$ are formed; in soil movement tests, such compounds remain at the granule site. These insoluble compounds, however, are extremely useful as conditioners and, more particularly, as slow-release sources of nitrogen, as described supra in the discussion of the embodiments of our invention which are of particular importance for supplying coated granular materials with micronutrients to form a fertilizer assemblage having desirable slow release or characteristics of controlled availability when applied to the soil.

Example XIX

Plant growth tests were made to compare agronomic response of micronutrient coated on granular fertilizer versus micronutrient incorporated in the granules. The crop was pea beans. Results were as follows:

| | Yield, bu./acre | |
| --- | --- | --- |
| | Coated | Incorporated |
| Micronutrient source: | | |
| Zinc sulphate | 20.0 | 16.9 |
| Zinc slag | 20.0 | 15.5 |
| Zinc carbonate | 19.7 | 16.1 |
| EDTA-zinc [1] | 31.1 | 27.1 |

[1] Zinc sequestered with ethylenediamine tetraacetic acid.

Example XX

Zinc oxide was combined with ammonium polyphosphate in various ratios and the solubility of the zinc determined by dissolving the granules in 10 parts water per part of fertilizer and analyzing for zinc in the filtered solution. Results were as follows:

Zn:$P_2O_5$ ratio:             Solubility of zinc, percent
   1:7 _____ 29.3
   1:10 _____ 62.5
   1:49 _____ 91.7

Hence the amount of micronutrient must be limited in order to obtain adequate solubility in the solution resulting from dissolution of the macronutrient material.

While we have shown and described numerous particular embodiments of our invention, modifications and variations thereof will occur to those skilled in the art. We wish it to be understood, therefore, that the appended claims are intended to cover such modifications and variations which are within the true scope of our invention.

What we claim as new and desire to secure by Letters Patent of the United States is:

1. A process for coating macronutrient-containing fertilizer granules with micronutrient values, which process consists of the steps of:
    (1) coating the macronutrient-containing fertilizer granules with pulverized micronutrient values, said pulverized micronutrient values selected from the group consisting of zinc, copper, iron, manganese, cobalt, boron, magnesium, molybdenum, sulfur, and mixtures thereof; and (2) preparing in situ on the surface of the granules to be coated a solution of macronutrient material by applying aqueous medium, said aqueous medium consisting of ammonium polyphosphate solution, to the granule surface, thereby dissolving macronutrient salt from said granule surface, said solution of macronutrient material effecting the cementing of said pulverized micronutrient values onto the surface of said macronutrient-containing fertilizer granules and said solution of macronutrient material characterized by the fact that in hydrolyzes slowly during subsequent storage of the coated granules, thereby taking up further amounts of water from the granule surface-coating solution interface.

2. A process for coating ammonium nitrate fertilizer particles with pulverized micronutrient values by forming on the ammonium nitrate particles a network of fine crystals on the irregular surfaces thereof, said network of fine crystals being the reaction product of ammonium nitrate, micronutrient values, and aqueous medium, by a process which comprises the steps of:

(1) coating the ammonium nitrate fertilizer particles with pulverized micronutrient values, said pulverized micronutrient values selected from the group consisting of zinc, copper, iron, manganese, cobalt, boron, magnesium, molybdenum, sulfur, and mixtures thereof; and (2) preparing in situ on the ammonium nitrate particle surfaces a solution of ammonium nitrate by applying aqueous medium, said aqueous medium consisting of ammonium polyphosphate solution, onto the surfaces of the ammonium nitrate granules coated with said pulverized micronutrient values.

3. The process of claim 1 wherein said ammonium polyphosphate solution has a grade of about 11–37–0.

References Cited

UNITED STATES PATENTS

| | | | |
|---|---|---|---|
| 2,901,317 | 8/1959 | Marti | 117—100 |
| 3,353,949 | 11/1967 | Nau | 71—64 |

REUBEN FRIEDMAN, Primary Examiner

C. N. HART, Assistant Examiner

U.S. Cl. X.R.

71—59, 64